United States Patent
Uematsu et al.

(10) Patent No.: US 11,575,981 B2
(45) Date of Patent: Feb. 7, 2023

(54) SIMULATION SIGNAL LIGHT GENERATION DEVICE AND SIMULATION SIGNAL LIGHT GENERATION METHOD

(71) Applicant: NIPPON TELEGRAPH AND TELEPHONE CORPORATION, Tokyo (JP)

(72) Inventors: Takui Uematsu, Musashino (JP); Tetsuya Manabe, Musashino (JP); Hidenobu Hirota, Musashino (JP); Hiroyuki Iida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 22 days.

(21) Appl. No.: 17/271,390

(22) PCT Filed: Aug. 23, 2019

(86) PCT No.: PCT/JP2019/033106
§ 371 (c)(1),
(2) Date: Feb. 25, 2021

(87) PCT Pub. No.: WO2020/045298
PCT Pub. Date: Mar. 5, 2020

(65) Prior Publication Data
US 2021/0195303 A1  Jun. 24, 2021

(30) Foreign Application Priority Data
Aug. 29, 2018 (JP) .............................. JP2018-160823

(51) Int. Cl.
*H04B 10/079* (2013.01)
*H04Q 11/00* (2006.01)
*H04L 12/46* (2006.01)

(52) U.S. Cl.
CPC ... *H04Q 11/0067* (2013.01); *H04B 10/07953* (2013.01); *H04L 12/4666* (2013.01);
(Continued)

(58) Field of Classification Search
CPC ........... H04Q 11/0067; H04Q 11/0071; H04Q 2011/0083; H04Q 2213/13292;
(Continued)

(56) References Cited

U.S. PATENT DOCUMENTS

| 2004/0057462 A1* | 3/2004 | Lim .................. H04Q 11/0067 370/468 |
| 2005/0058071 A1* | 3/2005 | Hirashima ......... H04Q 11/0067 370/235 |

(Continued)

FOREIGN PATENT DOCUMENTS

| JP | 2014212407 A | 11/2014 |
| JP | 2014236484 A | 12/2014 |

(Continued)

OTHER PUBLICATIONS

Basic Technology Course GE-PON Technology 2nd IEEE802.3ah Standard, NTT Technology Journal, Sep. 2005.

*Primary Examiner* — Tanya T Motsinger (57) ABSTRACT

The present disclosure intends to provide an optical signal from an ONU according to a desired service usage state without using the ONU and an OLT. A simulated signal light generation apparatus 10 according to the present disclosure is a simulated signal light generation apparatus 10 for simulating an uplink signal light generated in an optical network unit (ONU) in a passive optical network (PON), and the apparatus includes a usage state control unit 11 that sets a service usage state of the ONU, a signal generation unit 12 that generates an uplink signal frame according to the usage state set by the usage state control unit 11, and an electrical/optical conversion unit 13 that converts an electrical signal (Continued)

from the signal generation unit 12 into an optical signal, and the optical signal from the electrical/optical conversion unit 13 is repeatedly transmitted to an optical fiber core 22.

16 Claims, 3 Drawing Sheets (52) U.S. Cl.
CPC . *H04Q 11/0071* (2013.01); *H04Q 2011/0083* (2013.01); *H04Q 2213/13292* (2013.01)

(58) Field of Classification Search
CPC .............. H04B 10/07953; H04B 10/07; H04L 12/4666; H04L 12/465
See application file for complete search history.

(56) References Cited

U.S. PATENT DOCUMENTS

| | | | |
|---|---|---|---|
| 2007/0189773 A1* | 8/2007 | Jung .................. | H04J 14/0282 398/72 |
| 2010/0027561 A1* | 2/2010 | Greborio ............ | H04Q 11/0067 370/468 |
| 2012/0106958 A1* | 5/2012 | Sakamoto ........... | H04J 14/0282 398/58 |
| 2012/0128349 A1* | 5/2012 | Mitsunaga ......... | H04Q 11/0067 398/25 |
| 2013/0202293 A1* | 8/2013 | Boyd ................. | H04Q 11/0067 398/9 |
| 2014/0099100 A1 | 4/2014 | Elhage | |
| 2014/0112659 A1 | 4/2014 | Kawamura et al. | |
| 2014/0126907 A1* | 5/2014 | Hirth .................. | H04Q 11/0062 398/58 |
| 2014/0294388 A1* | 10/2014 | Odaka ................... | H04J 3/1694 398/66 |
| 2014/0314401 A1 | 10/2014 | Fujimori | |
| 2015/0222361 A1* | 8/2015 | Dhaini ............... | H04Q 11/0067 398/66 |
| 2017/0041248 A1* | 2/2017 | Toy .................... | H04Q 11/0067 |
| 2017/0279527 A1* | 9/2017 | Kim .................... | H04B 10/272 |
| 2019/0335410 A1* | 10/2019 | Toy ................... | H04W 56/0035 |
| 2020/0145178 A1* | 5/2020 | Finkelstein .......... | H04L 5/0094 |
| 2021/0243309 A1* | 8/2021 | Stepnioski .......... | H04L 12/1403 |
| 2022/0137145 A1* | 5/2022 | Lee .................... | H01M 10/482 324/430 |

FOREIGN PATENT DOCUMENTS

| | | |
|---|---|---|
| JP | 201561270 A | 3/2015 |
| JP | 2015132775 A | 7/2015 |
| WO | WO-2013002333 A1 | 1/2013 |

\* cited by examiner

SIMULATION SIGNAL LIGHT GENERATION DEVICE AND SIMULATION SIGNAL LIGHT GENERATION METHOD

CROSS-REFERENCE TO RELATED APPLICATIONS

This application is a 371 U.S. National Phase of International Application No. PCT/JP2019/033106 filed on Aug. 23, 2019, which claims priority to Japanese Application No. 2018-160823 filed on Aug. 29, 2018. The entire disclosures of the above applications are incorporated herein by reference.

TECHNICAL FIELD

This disclosure relates to an apparatus and method that simulate an optical path on the lower side of an optical splitter in a passive optical network (PON).

BACKGROUND ART

A communication monitor has been proposed for monitoring communication of an optical line termination device in a user home, which is connected to an end of a target optical fiber core at a connection point of an outside line without entering an exchange station (for example, see Patent Literature 1). In the communication monitor in Patent Literature 1, by bending the target current optical fiber core so as not to affect communication and receiving leaked light, an uplink signal light can be acquired from the optical line termination device connected to the end of the optical fiber core, and an MAC address and service usage state of the optical line termination device can be monitored from the acquired signal.

When inspecting, verifying, and evaluating an apparatus for implementing the technique in Patent Literature 1 and training the operator, it is necessary to use an optical signal from the optical line termination device and to prepare an optical signal matching the desired service usage state.

Here, a passive optical network (PON) including a gigabit Ethernet passive optical network (GE-PON) is configured of an optical line terminal (OLT), which is a parent device and a optical line termination device, and optical network units (ONUs), which are child devices and are optical line termination devices, and the OLT controls and manages a plurality of ONUs to perform communication.

In the PON, since the OLT controls timing at which each ONU emits the uplink signal light such that the uplink signal light does not collide with an uplink signal light from another ONU, each ONU emits the uplink signal light only when connected to the OLT and receiving a downlink signal light from the OLT. Accordingly, in order to build a verification system for verification, evaluation, and the like of the above-described apparatus, it is required to prepare the ONU and the OLT and connect them, contract with a service provider, and prepare a user terminal, a phone, or the like for simulating the state of calling, IP communication, or so on. In this manner, a lot of articles need to be prepared, which is very labor intensive. In addition, the verification place is disadvantageously limited because the verification system can be constructed only at the place where the optical fiber core connected to the OLT can be connected to the ONU.

CITATION LIST

Patent Literature

Patent Literature 1: JP 2015-132775A

Non Patent Literature

Non Patent Literature 1: Technical Base Program GE-PON the 2nd IEEE802.3ah Technical Standard, NTT Technical Journal, 2005.9.

SUMMARY OF THE INVENTION

Technical Problem

Therefore, in order to solve the problems described above, an object of the present disclosure is to prepare an uplink signal light from an ONU according to a desired service usage state without using the ONU and an OLT.

Means for Solving the Problem

An apparatus and a method are provided that even when a downlink signal light from the OLT is not received, can perform functions of emitting uplink signal light from ONU with only one apparatus, and controlling to transmit a simulated uplink signal frame according to a desired service usage state.

Specifically, a simulated signal light generation apparatus according to the present disclosure is a simulated signal light generation apparatus for simulatively generating an uplink signal light generated in an optical network unit (ONU) in a passive optical network (PON), the apparatus including:

a usage state control unit configured to set a service usage state of the ONU;

a signal generation unit configured to generate an uplink signal frame according to the usage state set by the usage state control unit; and an electrical/optical conversion unit configured to convert an electrical signal from the signal generation unit into an optical signal, wherein the optical signal from the electrical/optical conversion unit is repeatedly transmitted as the uplink signal light to an optical fiber core.

Specifically, a simulated signal light generation method according to the present disclosure is a simulated signal light generation method performed by a simulated signal light generation apparatus for simulatively generating an uplink signal light generated in an optical network unit (ONU) in a passive optical network (PON), the method including:

setting a service usage state of the ONU;

generating an uplink signal frame according to the usage state by the setting for the usage state; and converting an electrical signal of the uplink signal frame in the generating into an optical signal, wherein the optical signal converted in the conversion is repeatedly transmitted as the uplink signal light to an optical fiber core.

Effects of the Invention

According to the present disclosure, it is possible to provide an uplink signal light from an ONU according to a desired service usage state without using the ONU and an OLT.

BRIEF DESCRIPTION OF DRAWINGS

FIG. 5 is a diagram illustrating an example of uplink signal light transmitted when a switch S2 or S3 is turned on.

DESCRIPTION OF EMBODIMENTS

Embodiments of the present disclosure will be described below with reference to the drawings. Note that the present disclosure is not limited to the embodiments described below. These embodiments are merely examples, and the present disclosure can be carried out with various modifications and improvements being made thereto based on knowledge of a person skilled in the art. In this specification and the drawings, constituent elements having the identical reference signs are assumed to be the same.

SUMMARY OF THE DISCLOSURE

Figure 1:
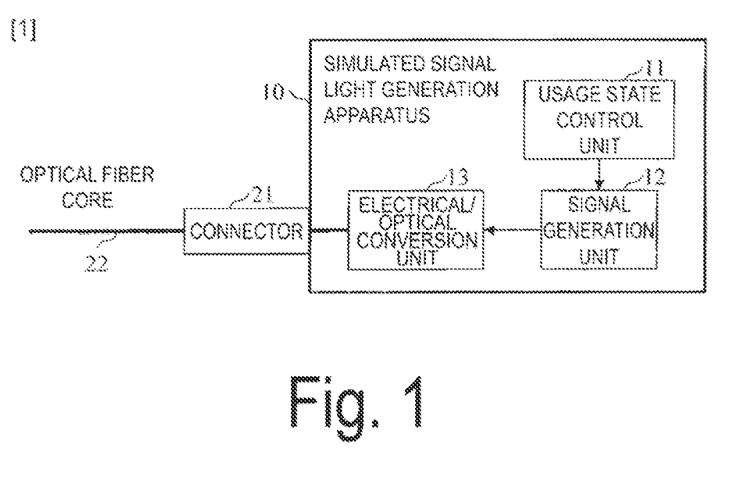
FIG. 1 is a configuration diagram illustrating an example of a simulated signal light generation apparatus according to the present disclosure.

As illustrated in FIG. 1, a simulated signal light generation apparatus 10 according to the present disclosure includes:
a usage state control unit 11 that controls a service usage state of the ONU;
a signal generation unit 12 that generates an uplink signal frame of the ONU according to the service usage state set by the usage state control unit 11; and
an electrical/optical conversion unit 13 that converts an electrical signal generated by the signal generation unit 12 into an optical signal and generates uplink signal light, wherein the simulated uplink signal light in a desired usage state (according to the service usage state set by the usage state control unit 11) is repeatedly transmitted to an optical fiber core 22.

In this way, according to the present disclosure, the simulated signal light generation apparatus 10 instead of the ONU simulatively transmits the uplink signal light transmitted in the GE-PON. The "uplink signal frame" described in the present disclosure is a data communication unit used for the uplink signal light transmitted in the GE-PON, and includes a data link layer (Layer 2) of an open systems interconnection (OSI) reference model.

A communication monitor (not illustrated) receives the simulated uplink signal light transmitted by the simulated signal light generation apparatus 10, and verifies whether or not an uplink signal frame loaded on the received uplink signal light is structured according to a desired service usage state. At this time, the usage state control unit 11 sets the service type offered to the ONU such as IP communication or phone. The signal generation unit 12 generates the uplink signal frame according to the service type. Thus, the present disclosure enables the communication monitor to perform inspection, verification, and evaluation of the uplink signal light matching the desired service type, and further, training of the operator at any location without using the actual ONU and OLT.

The service type and service name may be different by the user of the simulated signal light generation apparatus 10. Thus, it is preferable that the service name set by the usage state control unit 11 can be set by the user of the simulated signal light generation apparatus 10. For example, it is preferable that the service name for a phone service can be set to "Hikari phone". In this case, the frame structure of the uplink signal frame generated by the signal generation unit 12 is preferably configurable for each service name.

Furthermore, the simulated signal light generation apparatus 10 can preferably display a list of service names offered in the GE-PON for each provider, and set the selected service name as the service type in the usage state control unit 11. In the present disclosure, the service usage state includes the state of the ONU during use of any service type that may be utilized by the ONU. For example, the service type may include priority in IP communication, and is not limited to IP communications and phones.

First Embodiment

Figure 2:
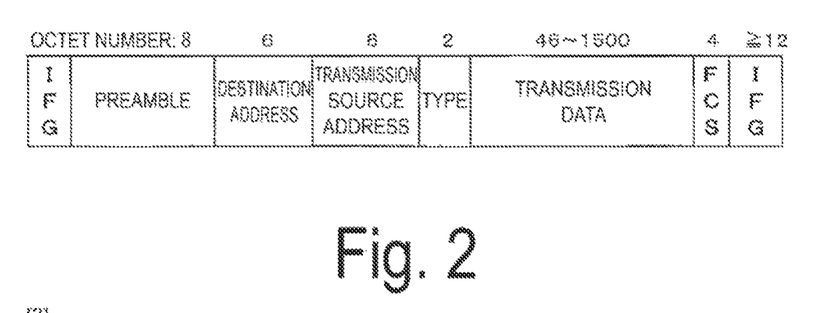
FIG. 2 is a diagram illustrating an example of an uplink signal frame transmitted by a GE-PON ONU at normal time.
Figure 3:
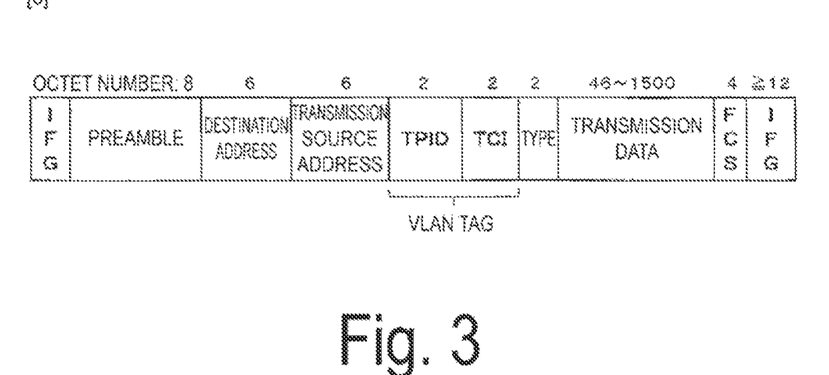
FIG. 3 is a diagram illustrating an example of an uplink signal frame transmitted by a GE-PON ONU at use of a VLAN tag.

An example of the uplink signal frame transmitted by the simulated signal light generation apparatus 10 according to the present embodiment will be illustrated below. The uplink signal frame of the GE-PON is defined by IEEE802.3ah (see Non Patent Literature 1) and has a frame structure as illustrated in FIG. 2 and FIG. 3. FIG. 2 illustrates the normal uplink signal frame during non-use of a VLAN tag, and FIG. 3 illustrates the uplink signal frame during use of the VLAN tag.

The simulated signal light generation apparatus 10 according to the present embodiment repeatedly transmits the simulated signal frame of either the first uplink signal frame illustrated in FIG. 2 or the second uplink signal frame illustrated in FIG. 3, according to the desired service usage state. As illustrated in FIG. 2, an uplink signal frame normally transmitted by the GE-PON ONU includes an Inter frame gap (IFG), a preamble, a destination address, a source address, a type, transmission data, a frame check sequence (FCS), and an IFG. The uplink signal frame transmitted by the GE-PON ONU during use of the VLAN tag includes a tag protocol identifier (TPID) and tag control information (TCI) between the source address and the type.

When no service such as phone or IP communication is used, the simulated signal light generation apparatus 10 only transmits the uplink signal frame in FIG. 2. On the other hand, when the service is being used, the simulated signal light generation apparatus 10 transmits the uplink signal frame in FIG. 3 at a predetermined cycle, and transmits the uplink signal frame in FIG. 2 at a cycle other than the predetermined cycle. By the service type, the value of the priority stored in the first 3 bits in the TCI in FIG. 3 is changed to a value (0 to 7) corresponding to each service, and the changed value is transmitted. It is also desirable to be able to change the cycle at which each uplink signal frame is transmitted from outside the simulated signal light generation apparatus 10.

Figure 4:
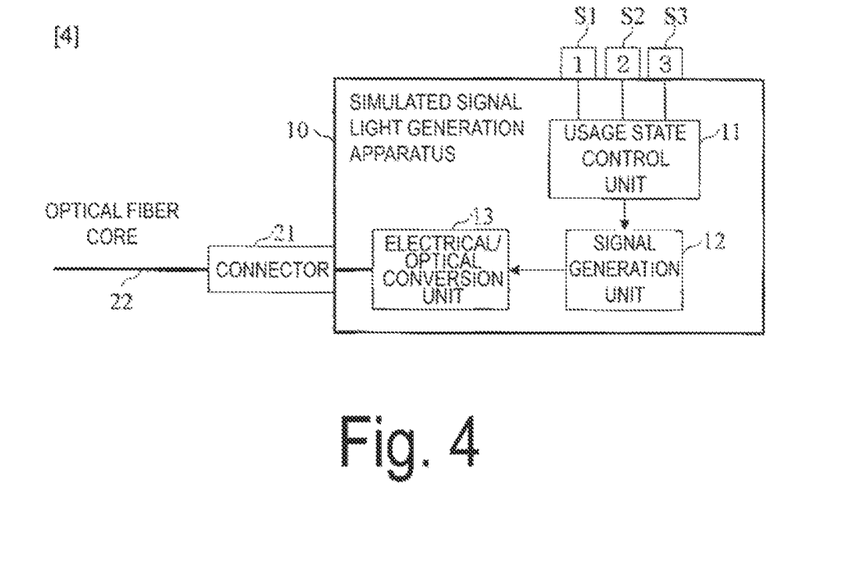
FIG. 4 is a configuration diagram illustrating an example of a simulated signal light generation apparatus according to a first embodiment.

FIG. 4 is an example of a configuration of the simulated signal light generation apparatus 10 for transmitting the uplink signal frame according to the first embodiment. The usage state control unit 11 is provided with switches S1, S2, and S3. The switch S1 turns on/off the uplink signal light, the switch S2 turns on/off the IP communication, and the switch S3 turns on/off the phone. Furthermore, it is preferable that the switch S2 can set the service usage state for the IP communication and the switch S3 can set the service usage state for the phone. Also, the setting of these service usage states may be selected from an identifier such as a service name listed on a screen instead of using the switches S1, S2, and S3.

According to the states of the switches S1, S2, and S3, the simulated uplink signal frame is repeatedly transmitted as described in the first embodiment. As a result, the communication monitor can perform inspection, verification, and evaluation of the data link layer and further, training of the operator by using the uplink signal frame.

Specifically,

When only the switch S1 is turned on, that is, when the VLAN tag is not used, only the first uplink signal frame as illustrated in FIG. 2 is transmitted. Two octets of the type of are transmitted as 0x88 and 0x08, respectively.

When the switches S1 and S2 are turned on, that is, using the VLAN tag, the first uplink signal frame illustrated in FIG. 2 and the second uplink signal frame corresponding to the IP communication are transmitted. In the second uplink signal frame, as in the signal frame as illustrated in FIG. 3, two octets of the uplink signal frame type are transmitted as 0x08 and 0x00 respectively, two octets of the TPID are transmitted as 0x81 and 0x00 respectively, and the first 3 bits of the priority of the TCI is transmitted as any value of 0 to 7 corresponding to the IP communication.

When the switches S1 and S3 are turned on, that is, using when the VLAN tag is used, the first uplink signal frame in FIG. 2 and a third uplink signal frame corresponding to the phone are transmitted. Also, in the third uplink signal frame, as in the signal frame illustrated in FIG. 3, two octets of the type are transmitted as 0x08 and 0x00 respectively, two octets of the TPID are transmitted as 0x81 and 0x00 respectively, and the first 3 bits of the priority of the TCI is transmitted as any value of 0 to 7 corresponding to the phone.

When all of the switches are turned on, all of the uplink signal frames in the above three cases are transmitted.

Here, the present disclosure can adopt a combination of arbitrary values for the VLAN tag, the TPID, and the TCI used in the IEEE802.1q, or any type used in the IEEE802.3ah. For example, when the switch S2 is turned on, an address resolution protocol (ARP) or IEEE802.1Q VLAN tagged frames may be used instead of the IPv4 specified in the above type.

Figure 5:
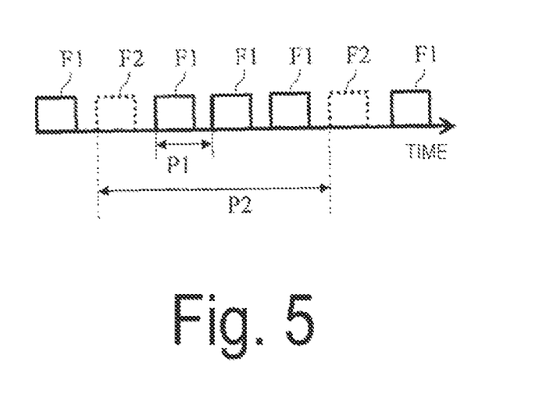

FIG. 5 illustrates an example of the transmission of the uplink signal frame in the case where the switch S2 or S3 is turned on. The second or third uplink signal frame F2 using the VLAN tag is transmitted at a second cycle P2, and the first uplink signal frame F1 illustrated in FIG. 2 is transmitted at a first cycle P1 other than the cycle P2. When the second and third uplink signal frames F2 are transmitted, the second and third uplink signal frames are transmitted at the respective cycles, and the first uplink signal frame F1 illustrated in FIG. 2 is transmitted at the other cycle. In this way, when the switch S2 or S3 is turned on, a part of the first uplink signal frame F1 is replaced with the second signal frame F2. Thus, given that N is a natural number, the second cycle P2 becomes N times of the first cycle P1.

Here, the transmitted uplink signal frame in the present disclosure is the simulated uplink signal frame, and the priority of the first 3 bits of TCI, destination address, source address, and transmission data are arbitrary. For example, the priorities of the second and third uplink signal frames for the TCI may be the same or different in the case where switches S1 and S2 are turned on and in the case where the switches S1 and S3 are turned on. In addition, the priority of the third uplink signal frame may be set to be lower than the priority of the second uplink signal frame instead of setting to be higher than the priority of the second uplink signal frame. In this manner, any setting that is not limited to the setting conforming to the standard specification is possible depending on purposes such as inspection, verification, evaluation of the communication monitor and further, training of the operator.

Note that, in the present embodiment, a single optical fiber core 22 is connected to the connector 21, but the present disclosure is not limited to this. For example, the connector 21 may be connected to a plurality of optical fiber cores 22 so as to be connectable to a plurality of communication monitors.

Second Embodiment

Figure 6:
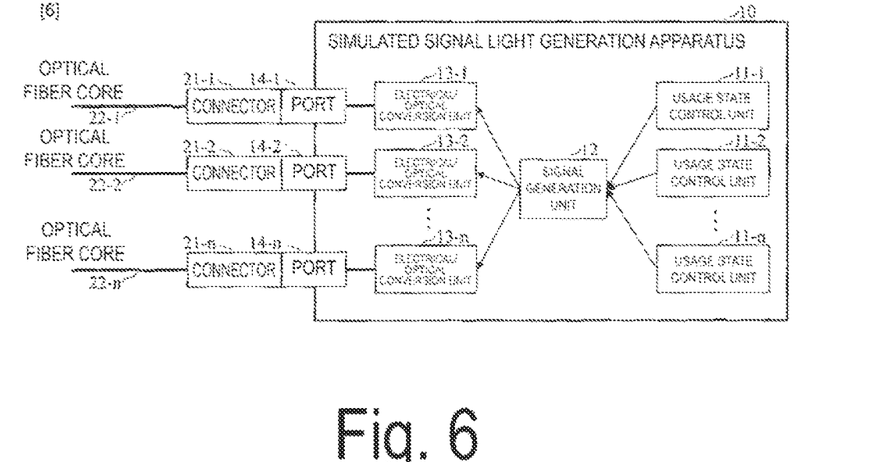
FIG. 6 is a configuration diagram illustrating an example of a simulated signal light generation apparatus according to a second embodiment.

The present embodiment is a configuration example of a simulated signal light generation apparatus 10 that transmits a plurality of different uplink signal frames. FIG. 6 illustrates an example of the simulated signal light generation apparatus 10 according to the present embodiment. The simulated signal light generation apparatus 10 according to the present embodiment includes n usage state control units 11-1 to 11-n, electrical/optical conversion units 13-1 to 13-n, n connectors 21-1 to 21-n, and a signal generation unit 12. Where n is any natural number. For example, n is the number of ONUs that can be connected to one OLT in the GE-PON, and may be any natural number of 32 or less.

The usage state control units 11-1 to 11-n can be set to different usage states. In response to information from the usage state control units 11-1 to 11-n, the signal generation unit 12 transmits an uplink signal frame to the n electrical/optical conversion units 13-1 to 13-n. The electrical/optical conversion units 13-1 to 13-n transmit the uplink signal frame corresponding to the service usage state from n respective ports 14-1 to 14-n, respectively. The order transmitted from the electrical/optical conversion units 13-1 to 13-n may be changed as appropriate, such as in the order of number or randomly.

Moreover, it is desirable to transmit each of the signals from the signal generation unit 12 to the n electrical/optical conversion units 13-1 to 13-n, with the source address in the uplink signal frame being converted into a value corresponding to each of the ports 14-1 to 14-n. At this time, as the source address of each of the ports 14-1 to 14-n, the source address of the simulated ONUs is used. As a result, the uplink signal frame from the plurality of ONUs in the GE-PON can be simulated.

Furthermore, it is desirable that the signal generation unit 12 also change the value of the LLID (logical link identifier) stored in the 6th octet and 7th octet in the preamble to a value (1 to N) corresponding to each of the ports 14-1 to 14-n, and transmits the signal. At this time, as the LLID of each of the ports 14-1 to 14-n, the LLID of each of the simulated ONUs is used. For example, different values such as 0x0001 and 0x0002, 0x000n are set. As a result, the uplink signal frame from the plurality of ONUs in the GE-PON can be simulated.

Third Embodiment

Figure 7:
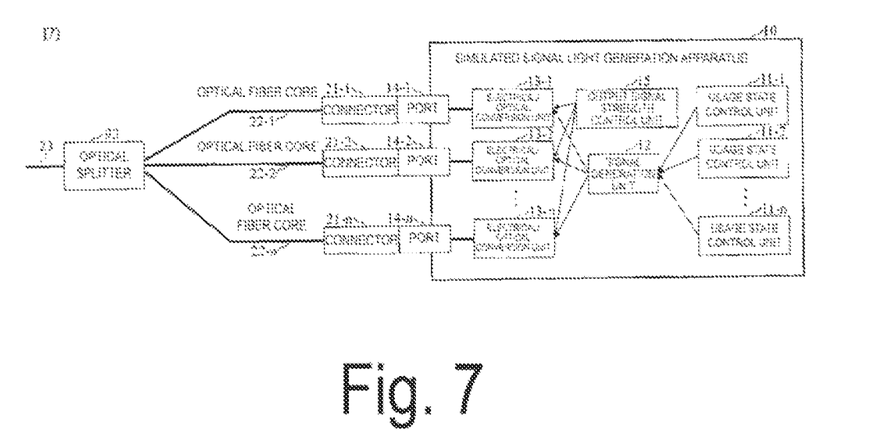
FIG. 7 is a configuration diagram illustrating an example of a simulated signal light generation apparatus according to a third embodiment.

The present embodiment relates to a simulated signal light generation apparatus for simulating an optical path on the lower side of an optical splitter. FIG. 7 illustrates an example of a simulated signal light generation apparatus 10 according to the present embodiment. In the simulated signal light generation apparatus 10 according to the present embodiment, distal ends of the optical fiber cores 22-1, 22-2, ..., 22-n are connected by an optical splitter 93. Thus, in the present embodiment, each of the ports 14-1 to 14-n can be simulated as each ONU connected to the lower side of the optical splitter 93.

Furthermore, the simulated signal light generation apparatus 10 according to the present embodiment includes an output signal strength control unit 15 for controlling the strength of output signals emitted from the electrical/optical conversion units 13-1, 13-2, ..., 13-n, in addition to the n usage state control units 11-1, 11-2, ..., 11-n and the electrical/optical conversion units 13-1, 13-2, ..., 13-n, and the signal generation unit 12 in the second embodiment. The output signal strength control unit 15 controls the strength of the output signals emitted from the electrical/optical conversion units 13-1, 13-2, ..., 13-n according to a simulated round trip time (RTT) corresponding to each of the ONUs simulated by the ports 14-1 to 14-n.

A method of controlling the strength of the output signal in the output signal strength control unit 15 may be any method. For example, the output signal strength control unit 15 directly controls the strength of the light output signals of the electrical/optical conversion units 13-1 to 13-n. In place of the output signal strength control unit 15, a variable attenuator (not illustrated) may be inserted between the connector 21 and the electrical/optical conversion units 13-1 to 13-n, to control the amount of loss.

In the present embodiment, since the simulated signal light generation apparatus 10 includes an output signal strength control unit 15, any path loss can be simulated for each of the optical fiber cores 22-1 to 22-n on the lower side of the optical splitter 93 without changing the length of the optical fiber cores 22-1, 22-2, ..., 22-n and the number of connections of the connectors 21-1 to 21-n on the lower side of the n-branched optical splitter 93.

It is also desirable to output signals from each of the electrical/optical conversion units 13-1 to 13-n so as to satisfy following conditions, such that the optical signals output from the n electrical/optical conversion units 13-1 to 13-n do not collide with each other in an optical fiber core 23 after being multiplexed by the n-branched optical splitter 93.

The cycle at which the optical signal is output from each of the electrical/optical conversion units 13-1 to 13-n is $(n \times 1.23 \times 10^{-5})$ seconds or more.

One electrical/optical conversion unit 13-$i$ ($i$=1 to n) starts to output a signal and after an elapse of $1.23 \times 10^{-5}$ seconds or more, another electrical/optical conversion units 13-$j$ ($j$=1 to n) outputs a signal.

For example, in the case of n=8, it is desirable that a signal is output from each of the electrical/optical conversion units 13-1 to 13-8 every $9.84 \times 10^{-5}$ seconds or more. Specifically, after an elapse of $1.23 \times 10^{-5}$ seconds or more since the electrical/optical conversion units 13-1 has output a signal, the electrical/optical conversion units 13-2 starts to output a signal and then, after an elapse of $1.23 \times 10^{-5}$ seconds or more, the electrical/optical conversion units 13-3 starts to output a signal (hereinafter, the same applies up to the conversion unit n).

In the present embodiment, a communication monitor can be connected at the optical fiber core 23 connected on the upper side of the optical splitter 93, that is, the OLT (not illustrated). In this case, the communication monitor acquires the source address and the priority (value of the IP communication or phone) for each LLID, and determines the source address and the service usage state for each port. In this way, the communication monitor can simulate the determination of the uplink signal frame from the plurality of ONUs in the GE-PON.

Note that in the present embodiment, the communication monitor may be connected to the optical fiber cores 22-1, 22-2, ..., 22-n on the lower side of the optical splitter 93, that is, on the side of the simulated signal light generation apparatus 10 that simulates the ONU. In this case, the communication monitor may acquire and store the source address and the priority (value of the IP communication or the phone) for each LLID. In this way, the communication monitor can simulate the determination of the uplink signal frame from the plurality of ONUs in the GE-PON.

INDUSTRIAL APPLICABILITY

The present disclosure may be applied to an information communication industry.

REFERENCE SIGNS LIST

10 Simulated signal light generation apparatus
11, 11-1, 11-2, 11-n Usage state control unit
12 Signal generation unit
13, 13-1, 13-2, 13-n Electrical/optical conversion unit
14-1, 14-2, 14-n Port
15 Output signal strength control unit
21, 21-1, 22-2, 22-n Connector
22, 22-1, 22-2, 22-n, 23 Optical fiber core
93 Optical splitter

The invention claimed is:

1. A simulated signal light generation apparatus for simulating an uplink signal light generated in an optical network unit (ONU) in a passive optical network (PON), the apparatus comprising:
   a usage state control unit configured to set a service usage state of the ONU;
   a signal generation unit configured to generate an uplink signal frame according to the service usage state set by the usage state control unit; and
   an electrical/optical conversion unit configured to convert an electrical signal from the signal generation unit into an optical signal, wherein
   the optical signal from the electrical/optical conversion unit is repeatedly transmitted as the uplink signal light to an optical fiber core,
   wherein:
      the service usage state of the ONU includes IP communication and phone,
      the uplink signal frame includes a tag protocol identifier identifying a VLAN tag and tag control information, and
      the signal generation unit generates the uplink signal frame including a combination of the tag protocol identifier and the tag control information corresponding to each of the IP communication and the phone.

2. The simulated signal light generation apparatus according to claim 1, wherein
when the usage state control unit sets non-use of the VLAN tag, the signal generation unit generates a first uplink signal frame using the tag protocol identifier during non-use of the VLAN tag at a preset first cycle, and
when the usage state control units sets use of the VLAN tag, the signal generation unit generates a second uplink signal frame using the combination of the tag protocol identifier and the tag control information during use of the VLAN tag at a second cycle greater than the first cycle, and replaces a part of the first uplink signal frame with the second uplink signal frame at the second cycle.

3. The simulated signal light generation apparatus according to claim 1, wherein
a plurality of the electrical/optical conversion units are provided,
the signal generation unit outputs the generated uplink signal frame to the electrical/optical conversion units defined for each usage state set by the usage state control unit, and
the electrical/optical conversion units output an optical signal to different ports defined for the respective electrical/optical conversion units.

4. The simulated signal light generation apparatus according to claim 3, wherein
the signal generation unit generates the uplink signal frame including a preamble describing a logical link identifier corresponding to one of the ports.

5. The simulated signal light generation apparatus according to claim 3, wherein
the signal generation unit generates the uplink signal frame describing a source address corresponding to the port.

6. The simulated signal light generation apparatus according to claim 3, wherein
the ports are connected to respective optical fiber cores having distal ends interconnected at an optical splitter, and
an optical signal is output with optical strength defined for the each port from each of the ports at such timing that the optical signals do not collide with each other after being multiplexed at the optical splitter.

7. A simulated signal light generation method performed by a simulated signal light generation apparatus for simulatively generating an uplink signal light generated in an optical network unit (ONU) in a passive optical network (PON), the method comprising:
setting a service usage state of the ONU;
generating an uplink signal frame according to the usage state by the setting for the usage state; and
converting an electrical signal of the uplink signal frame in the generating into an optical signal, wherein
the optical signal converted in the conversion is repeatedly transmitted as the uplink signal light to an optical fiber core,
wherein:
the service usage state of the ONU includes IP communication and phone,
the uplink signal frame includes a tag protocol identifier identifying a VLAN tag and tag control information, and generating the uplink signal frame includes generating the uplink signal frame including a combination of the tag protocol identifier and the tag control information corresponding to each of the IP communication and the phone.

8. The simulated signal light generation method according to claim 7, wherein
when non-use of the VLAN tag is set, generating the uplink signal frame includes generating a first uplink signal frame using the tag protocol identifier during non-use of the VLAN tag at a preset first cycle, and
when use of the VLAN tag is set, generating the uplink signal frame includes generating a second uplink signal frame using the combination of the tag protocol identifier and the tag control information during use of the VLAN tag at a second cycle greater than the first cycle, and replacing a part of the first uplink signal frame with the second uplink signal frame at the second cycle.

9. The simulated signal light generation method according to claim 7, wherein
generating the uplink signal frame includes outputting the generated uplink signal frame to electrical/optical conversion units defined for each usage state set, and
the method further includes, by the electrical/optical conversion units, outputting an optical signal to different ports defined for the respective electrical/optical conversion units.

10. The simulated signal light generation method according to claim 9, wherein
generating the uplink signal frame includes generating the uplink signal frame including a preamble describing a logical link identifier corresponding to the port.

11. The simulated signal light generation method according to claim 9, wherein
generating the uplink signal frame includes generating the uplink signal frame describing a source address corresponding to one of the ports.

12. The simulated signal light generation method according to claim 9, wherein
the ports are connected to respective optical fiber cores having distal ends interconnected at an optical splitter, and
the method includes outputting an optical signal with optical strength defined for the each port from each of the ports at such timing that the optical signals do not collide with each other after being multiplexed at the optical splitter.

13. A simulated signal light generation apparatus for simulating an uplink signal light generated in an optical network unit (ONU) in a passive optical network (PON), the apparatus comprising:
a usage state control unit configured to set a service usage state of the ONU;
a signal generation unit configured to generate an uplink signal frame according to the service usage state set by the usage state control unit; and
an electrical/optical conversion unit configured to convert an electrical signal corresponding to the service usage state of the ONU from the signal generation unit into an optical signal, wherein
the optical signal from the electrical/optical conversion unit is repeatedly transmitted as the uplink signal light to an optical fiber core,
wherein an order of transmission from the electrical/optical conversion unit is changed in one of (a) a numerical order and (b) a random order.

14. The simulated signal light generation apparatus of claim 13 further comprising a plurality of other electrical/optical conversion units configured to transmit the uplink signal frame from respective ports.

15. The simulated signal light generation apparatus of claim 14 wherein an order of transmission from the electrical/optical conversion units is set based on a number of the electrical/optical conversion units.

16. The simulated signal light generation apparatus of claim 14 wherein an order of transmission from the electrical/optical conversion units is set randomly.

\* \* \* \* \*